United States Patent [19]

Davis, Jr. et al.

[11] Patent Number: 4,719,748

[45] Date of Patent: Jan. 19, 1988

[54] IMPINGEMENT COOLED TRANSITION DUCT

[75] Inventors: Lewis B. Davis, Jr., Schenectady; Walter W. Goodwin, Loudonville; Charles E. Steber, Scotia, all of N.Y.

[73] Assignee: General Electric Company, Schenectady, N.Y.

[21] Appl. No.: 941,580

[22] Filed: Dec. 15, 1986

Related U.S. Application Data

[63] Continuation of Ser. No. 734,018, May 14, 1985, abandoned.

[51] Int. Cl.[4] .................. F02C 3/00

[52] U.S. Cl. .................. 60/39.37; 60/758; 60/760

[58] Field of Search .................. 60/39.83, 760, 757, 60/758, 759, 754, 751, 39.37

[56] References Cited

U.S. PATENT DOCUMENTS

| | | | |
|---|---|---|---|
| 3,169,367 | 2/1965 | Hussey | 60/760 |
| 3,557,553 | 1/1971 | Schmitz | 60/754 |
| 3,652,181 | 3/1972 | Wilhelm, Jr. | 60/748 |
| 4,297,843 | 11/1981 | Sato et al. | 60/39.37 |
| 4,339,925 | 7/1982 | Eggmann et al. | 60/760 |

FOREIGN PATENT DOCUMENTS

| | | | |
|---|---|---|---|
| 182034 | 10/1983 | Japan | 60/757 |
| 85429 | 5/1984 | Japan | 60/758 |

*Primary Examiner*—Louis J. Casaregola
*Assistant Examiner*—Donald E. Stout
*Attorney, Agent, or Firm*—Jerome Squillaro

[57] ABSTRACT

A transition duct in an advanced heavy duty gas turbine engine is cooled by impingement jets formed by apertures in a sleeve spaced a distance from the surface to be cooled. The sleeve is configured so as to duct spent impingement air towards the combustor, where it can be subsequently used for mixing with, and combustion of, the fuel, or for cooling of the combustor. The distance between the impingement sleeve and the transition duct surface is varied to control the velocity of air crossflow from spent impingement air in order to minimize the pressure loss due to crossflow. The cross-sectional areas of the apertures are varied to project impingement jets over the various distances and crossflow velocities. Generally, larger aperture areas are used with larger distances. The distance between the impingement sleeve and the transition duct systematically increases towards the combustor as the quantity of spent impingement air increases to a maximum value at the intersection of the combustor and the transition duct. The combination of variations in distance, aperture size, and inter-aperture spacing is utilized to vary the impingement cooling intensity to compensate for the variable internal heat load and also to produce the desired temperature distribution over the surface of the transition duct according to design requirements. The aforementioned variations are optimized to minimize the air flow pressure drop ahead of the combustion system which achieving the required cooling intensity according to design requirements.

11 Claims, 8 Drawing Figures

23
36
20
V
V
68
18
66
70
22
32
73
72
70'
AIR FLOW
10
26
12
24
14

IMPINGEMENT COOLED TRANSITION DUCT

This application is a continuation of application Ser. No. 734,018, filed May 14, 1985, now abandoned.

BACKGROUND OF THE INVENTION

The present invention relates to gas turbine engines and, more particularly, to apparatus for cooling a transition duct employed to conduct hot gasses from a combustor to a turbine stage of an advanced heavy duty gas turbine engine.

A large heavy duty gas turbine engine conventionally employs a plurality of cylindrical combustor stages operated in parallel to produce hot energetic gas for introduction into the first turbine stage of the engine. The first turbine stage preferably receives the hot gas in the shape of an annulus. A transition duct is disposed between each of the combustor stages and the first turbine stage to change the gas flow field exiting each combustor from a generally cylindrical shape to one which forms part of an annulus. The gas flow from all of the transition ducts thus produces the desired annular flow.

As well known, the thermodynamic efficiency of which a heat engine is capable depends on the maximum temperature of its working fluid which, in the case of a gas turbine, is the hot gas exiting the combustor stages. The maximum feasible temperature of the hot gas is limited by the operating temperature limit of the metal parts in contact with this hot gas, and on the ability to cool these parts below the hot gas temperature. The task of cooling the transition duct of an advanced heavy duty gas turbine engine, which is the one addressed by the present invention, is difficult because currently known cooling methods are either inadequate, or carry unacceptable penalties.

In a conventional heavy duty gas turbine engine, the entire external surface of the transition duct is exposed to relatively cool air discharged from the compressor, which supplies the total air flow for the gas turbine. The flow of air over the exterior of the transition duct to the combustor causes passive cooling. Some portions of the exterior of the transition duct are relatively well cooled by passive cooling, but others are poorly cooled thereby. Additionally, the portions of the exterior of the transition duct that are most poorly cooled are generally in structurally weaker areas, which are also areas more highly heated by the hot gas therewithin. To avoid failure resulting from excessive metal temperatures, the maximum combustor exit temperature must be limited by the maximum allowed metal temperature of the most poorly cooled areas of the transition duct. As heavy duty gas turbine combustor exit temperatures have been raised to promote increased thermal efficiency, various means to cool actively the relatively hot areas of the transitional duct have been employed. In an advanced heavy duty gas turbine, for which the combustor exit temperature is to be significantly higher than the approximately 2000 degrees usual to heavy duty gas turbines, the entire surface of the transition duct must be actively cooled, so that metal temperatures are kept to an acceptable level.

Known methods for cooling the walls of combustors permit air discharged by the compressor to pass through the combustor wall, and then direct it along the inside surface thereof, as a film to protect it from direct contact with the hot gas. This arrangement permits the combustor wall to operate significantly below the temperature of the hot gas. This film cooling method has been used for limited areas of the transition duct, especially those poorly cooled areas described above. However, the use of such film cooling is limited by the amount of air available exclusively for cooling the combustor and transition duct walls. This amount is typically less than thirty percent of the total air flow available to the combustor. For an advanced heavy duty gas turbine engine, virtually all of the air available for film cooling is required for cooling the combustor walls, and very little is available for cooling the transition duct walls. This limited availablity of cooling air flow comes about because approximately half of the total combustor air flow is required for complete combustion of the fuel and another quarter of the air flow is required for dilution and shaping of the hot gas profile exiting the combustor as required by the first turbine stage for acceptable efficiency and component life. These proportions can be altered slightly, depending on the particular design choices in a gas turbine engine, but a variety of practical obstacles blocks any large departure from them.

Another cooling technique which has found use in cooling the exterior of the transition duct employs an impingement plate, baffle or sleeve disposed a short distance away from the transition duct outer surface. The impingement sleeve contains an array of holes through which compressor discharge air passes to generate an array of air jets which impinge on and cool the outer surface of the transition duct.

U.S. Pat. No. 3,652,181 discloses such an impingement cooling technique for a transition duct in which the impingement sleeve surrounds only a portion of the transition duct. After impacting the surface to be cooled, the spent impingement air flows in the space between the transition duct outer surface and the impingement sleeve, towards holes in the transition duct. The air passing through these holes mixes with, and reduces the hot gas temperature just ahead of, the root area of the turbine blades and thus helps reduce the metal temperature of this portion of the turbine blades. Depending upon the heat transfer rate from the hot gas and the maximum allowed metal temperature, this method can use less cooling air than film cooling to maintain acceptable metal temperatures, and can be used in combination with film cooling to further reduce metal temperature. However, even the combination of impingement and film cooling for a transition duct would require more cooling air than is available in an advanced heavy duty gas turbine.

Further disclosure of impingement cooling of a gas turbine combustion component is found in U.S. Pat. No. 4,339,925. Although it is directed toward cooling a type of gas turbine combustion component which is completely different from that towards which the present invention is directed, this patent discloses typical elements of an impingement cooling system. There is disclosed therein a shell which has an array of holes through which cooling air passes to impinge on a hot gas casing towards the combustor. An embodiment is illustrated and described in which the impingement air flows along the hot gas casing eventually to enter the combustion process. A restrictor is disclosed for aiding the ejection of air from the space between the hot gas casing and the perforated shell. This patent recognizes that the number of inlet openings, as well as the spacing of the shell from the hot gas casing, represent variables which can be employed to produce the cooling effects required by the situation.

It can be seen from the prior art, as disclosed in U.S. Pat. Nos. 3,652,181 and 4,339,925, that impingement cooling of a combustion component can either consume a portion of the air flow allocated to the combustion process, or be performed in series with the combustor such that the air used to cool a combustion component is subsequently used in the combustion process. It is the series mode of cooling a transition duct which is addressed by the present invention.

For reasons which are well known by those skilled in the art of gas turbine design, there is a pressure drop or loss associated with forcing the compressor discharge air through openings in the combustor wall, to mix and burn with the fuel. This same pressure drop promotes the film cooling of the combustor and the dilution air jets which, in turn, shapes the temperature pattern of the air exiting the early portion of the combustor. Typically, this pressure drop falls between two and four percent of the compressor discharge pressure and, for reasons of thermal efficiency, is kept as low as possible. If the pressure drop is too low, poor mixing of the fuel and air, and resultant poor combustion, will result. If the pressure drop is too high, the gas turbine thermodynamic efficiency will be reduced.

In order to achieve impingement cooling, a pressure drop is required across the impingement sleeve or baffle, thereby forcing the cooling air through the holes at a sufficiently high velocity to achieve the required heat transfer rate. Generally, higher cooling rates are achieved by a higher pressure drop. Thus, it can be seen that employing impingement cooling of a transition duct in a series air-flow arrangement, will create an additional pressure drop to the combustion system which, if not kept to the lowest possible level, could cause a reduction in thermal efficiency greater than the increase obtained by raising the combustor exit temperature.

The pressure drop of an impingement cooling system essentially is generated by two components. First, there is a pressure drop needed to accelerate the air through the impingement sleeve holes to create the jets which impinge of the surface to be cooled. The second is more subtle, and is largely ignored in other known impingement cooling applications.

If the spent impingement air is to be used in the combustor, it must be collected and brought to the combustor. The collection naturally takes place between the impingement sleeve and the external surface of the transition duct, and it will be seen that, as one moves towards the combustor, the air flow velocity must steadily increase as more air is collected. The second component of pressure drop occurs due to the requirement to reaccelerate each additional quantity of spent impingement air to the velocity of that air already moving towards the combustor.

The local magnitude of the heat transfer in an impingement cooling system is determined by a number of variables. In particular, these variables include the cooling air properties, the local distance between the impingement sleeve and the transition duct surface, the hole size, spacing and array pattern, the impingement air jet velocity, and the velocity of air flowing perpendicular to the air jet such as, for example, air resulting from the collection of spent impingement air.

It can be seen that the number of variables which affect both the magnitude of heat transfer and the pressure drop of the overall impingement cooling system is large. The invention addresses the interplay of these variables for a successful design of a fully cooled transition duct for an advanced heavy gas turbine engine.

An air jet formed by an opening in an impingement plate must traverse the space separating the impingement plate from the surface to be cooled, and must impact the surface to be cooled with sufficient velocity and in sufficient volume to effect the desired cooling. The analysis of such jet impingement is relatively simple when only a single jet is involved. However, when an array of jets is used, the impingement air flowing away after impingement from one jet, captured between the surface being cooled and the impingement plate, tends to produce a crossflow of air which interfers with the cooling action of other jets, particularly those downstream in the direction along which the impingement air must flow to exit the constraining space. That is, a crossflow of air passing through the space between an aperture and the surface to be cooled may prevent the aperture-produced air jet from reaching the surface to be cooled, or may reduce the effectiveness of any portion of the air jet which may reach the surface to be cooled. The actual cooling effects of an array of jets is difficult to predict, and so may only be derived empirically.

The greater the velocity of the crossflow, the more the crossflow interferes with the effectiveness of the air jets. In the case of an impingement cooled transition duct in which all of the impingement air must flow outwardly from between the transition duct and the impingement plate, the amount of crossflowing air and its velocity increases systematically as it moves toward the exit. The increased velocity may partically or completely destroy the effectiveness of impingement jets located downstream thereof. It may be for this reason that a number of prior art devices employing impingement cooling of a transition duct (or a hot gas casing) provide for injecting the use impingement air into the interior of the transition duct. As discussed, this inefficient use of available cooling air is unacceptable for an advanced heavy duty gas turbine design.

OBJECTS AND SUMMARY OF THE INVENTION

Accordingly, it is an object of the invention to provide an impingement cooling system for a transition duct which overcomes the drawbacks of the prior art.

More specifically, it is an object of the invention to provide impingement cooling for an entire transition duct of a gas turbine engine which permits tailoring the cooling distribution according to the transition duct design requirements.

It is a still further object of the invention to provide impingement cooling of a transition duct in which at least one of an aperture size, an aperture spacing in an impingement cooling sleeve and the spacing between the impingement sleeve and the surface to be cooled is systematically varied to tailor the surface cooling.

It is a still further object of the invention to provide impingement cooling of a transition duct of a gas turbine engine in which a spacing between an impingement sleeve and the transition duct is systematically increased in the downstream direction of the crossflow of the impingement air in order to reduce the crossflow air velocity and thereby reduce the pressure drop of the impingement cooling sleeve.

It is a still further object of the invention to provide impingement cooling of an entire transition duct of an advanced heavy duty gas turbine, in which the aperture size and spacing in an impingement cooling sleeve and the spacing between the impingement sleeve and the transition duct surface are systematically varied to minimize the pressure drop required for the impingement cooling, thereby maximizing the thermal efficiency of the gas turbine engine.

It is a still further object of the invention to provide impingement cooling of a transition duct of a gas turbine engine in which openings in some portions of the impingement sleeve are larger than openings in other portions thereof thereby providing jets of higher mass-flow which may penetrate across larger gaps between the transition duct and the impingement sleeve, and through greater crossflow of air. The spacing between these larger holes is preferably varied relative to the spacing of the smaller holes, to establish a desired impingement cooling intensity as required by the transition duct design.

It is a still further object of the invention to provide an impingement cooling and air flow distribution system which precisely controls the impingement cooling pressure drop and which minimizes the combustor air flow pressure drop upstream of the combustor pressure drop.

Briefly stated, the present invention provides impingement cooling for a transition duct in an advanced heavy duty gas turbine engine. The transition duct is cooled by impingement jets formed by apertures in a sleeve spaced a distance from the surface to be cooled. The sleeve is configured so as to duct spent impingement air towards the combustor, where it can be subsequently used for mixing with, and combustion of, the fuel, or for cooling of the combustor. The distance between the impingement sleeve and the transition duct surface is varied to control the velocity of air crossflow from spent impingement air in order to minimize the pressure loss due to crossflow. The cross-sectional areas of the apertures are varied to project impingement jets over the various distances and crossflow velocities. Generally, larger aperture areas are used with larger distances. The distance between the impingement sleeve and the transition duct increases systematically towards the combustor as the quantity of spent impingement air increases to a maximum value at the intersection of the combustor and the transition duct. The combination of variations in distance, aperture size, and inter-aperture spacing is utilized to vary the impingement cooling intensity to compensate for the variable internal heat load and also to produce the desired temperature distribution over the surface of the transition duct according to design requirements. The aforementioned variations are optimized to minimize the air flow pressure drop ahead of the combustion system which achieving the required cooling intensity according to design requirements.

According to an embodiment of the invention, there is provided an impingement cooling apparatus for cooling a surface, the surface being disposed in a compressed air environment, comprising an impingement plate spaced a distance from the surface, a plurality of apertures in the impingement plate, means for producing a pressure drop across the impingement plate whereby each of the apertures produces an impingement jet directed toward the surface, the apertures having an area, the apertures being spaced apart by a spacing and at least one of the distance, the area and the spacing being varied over the impingement plate to control a cooling in the surface.

According to a feature of the invention, there is provided an impingement cooling apparatus for cooling a surface of a transition duct disposed between a combustor and a turbine stage of a gas turbine engine, the transition duct being disposed in a compressed air plenum, comprising an impingement sleeve surrounding the transition duct and spaced a distance therefrom to form a flow volume therebetween, a plurality of apertures in the impingement sleeve, each of the plurality of apertures having an area, adjacent ones of the apertures being separated by a spacing, a closed end at a turbine end of the flow volume, an exit at a combustor end of the flow volume, a flow sleeve surrounding the combustor, a flared entry portion at an end of the flow sleeve adjacent overlapping the exit and forming an aerodynamic converging shape therebetween, a flow of air through the aerodynamic converging shape flowing toward the combustor being effective to reduce a pressure at the exit below a pressure in the plenum whereby a pressure drop across the impingement sleeve produces an impingement jet of air from each of the apertures directed toward the transition duct and at least one of the distance, the area and the spacing being varied over the impingement sleeve to control a cooling in the surface.

According to a further feature of the invention, there is provided an impingement cooling apparatus for cooling an enclosed surface formed by a wall affixed to a transition duct, the transition duct being enclosed by an impingement sleeve, the wall passing through an opening in the impingement sleeve, the transition duct and the impingement sleeve being disposed in a plenum effective to contain a pressurized air environment, comprising an impingement insert within the wall having a planar bottom spaced a distance from the enclosed surface, a plurality of apertures in the planar bottom, means for producing a pressure drop across the impingement insert whereby each of the apertures produces an impingement jet directed toward the enclosed surface, the apertures having an area, the apertures being spaced apart by a spacing, the enclosed surface including at least one film cooling aperture through the transition duct for exhausting spent impingement cooling air from between the impingement insert and the enclosed surface and the area and the spacing being varied over the planar bottom to tailor a cooling in the surface.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
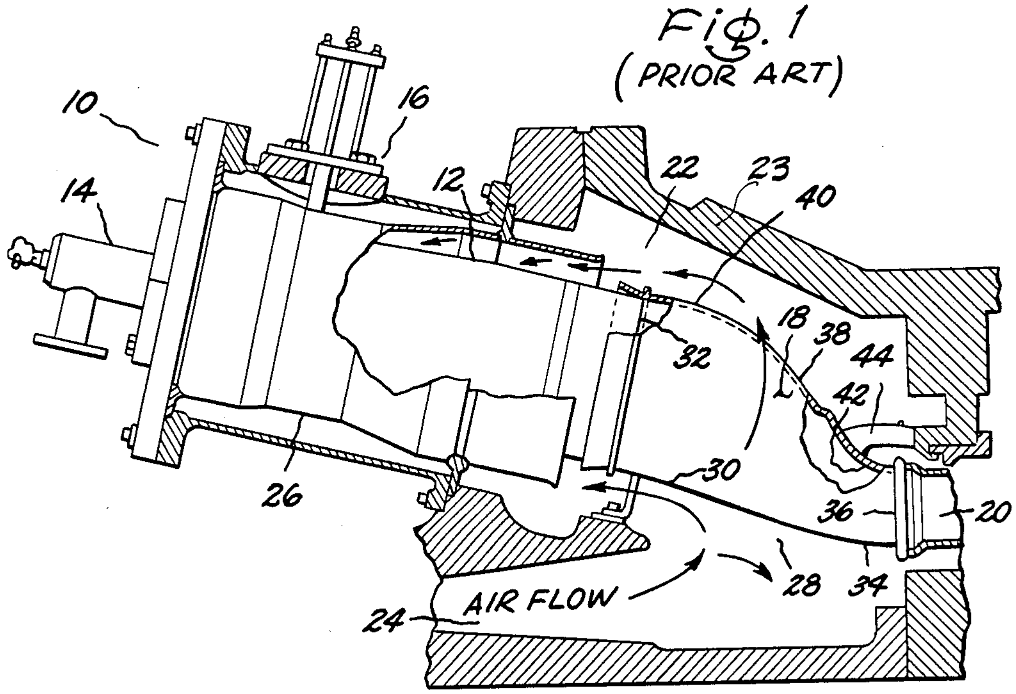
Fig. 1 (PRIOR ART)
FIG. 1 is a simplified view, partially in cross section, of a combustor and a transition duct employing cooling according to the prior art.

Referring first to FIG. 1, there is shown, generally at 10, a portion of a gas turbine engine according to the prior art. Gas turbine engine 10 includes a plurality of combustors 12, only one of which is shown, uniformly disposed with respect to a longitudinal axis thereof. In one type of gas turbine engine 10, ten combustors 12 are employed. Fuel and primary combustion air are injected into combustor 12 through a fuel nozzle 14. The fuel and air, ignited by a spark plug 16, burn within combustor 12. The hot products of combustion and heated excess air pass through a transition duct 18 to the inlet end of a turbine stage 20.

Combustor 12 and transition duct 18 are contained within a plenum 22 founded in part by a turbine casing 23, to which a supply of compressed air is fed from a compressor outlet 24 of gas turbine engine 10. Compressed air from compressor outlet 24 flows along the surface of combustor 12 where it is admitted to the interior of combustor 12 through conventional apertures (not shown) in the surface thereof. The air thus admitted to the interior of combustor 12 enters into the combustion reaction downstream of fuel nozzle 14 or may be directed as a cooling film along the inner surface of combustor 12. Some compressed air may also be employed for diluting the hot gas to control and profile the temperature of the effluent of combustor 12. A flow sleeve 26 may be provided surrounding combustor 12 for improving the flow of air along the walls thereof.

The outside surface of transition duct 18 is convectively cooled by compressed air flowing from the compressor outlet 24 toward combustor 12. A radially inner surface 28 of transistion duct 18 is disposed in the direct flow of compressor air as it changes direction after exiting compressor outlet 24. In particular, a portion 30 of radially inner surface 28 nearer a combustor end 32 of transition duct 18 is more than adequately cooled. A portion 34 of radially inner surface 28 nearer a turbine end 36 is cooled less strongly. In contrast, a radially outer surface 38 of transition duct 18 is protected from the direct flow of compressed air from compressor outlet 24.

A portion 40 of radially outer surface 38 nearer combustor end 32 is cooled by compressed air flowing about the circumference of transition duct 18 on its way to combustor 12. Such cooling is substantially less effective than that experienced by radially inner surface 28. A portion 42 of radially outer surface 38 nearer turbine end 36 is most poorly cooled since very little compressed air circulates therepast. Thus, the cooling effectiveness on transition duct 18 tends to decrease from combustor end 32 to turbine end 36. The cooling problem on portion 42 is additionally complicated by the fact that the hot gas flowing within transition duct 18 is strongly turned in this region. Thus, highly effective convective heat transfer from the hot gas operates on portion 42. As a consequence, portion 42 becomes the hottest part of transition duct 18 and provides the effective limit on the temperature of the hot gas which can be admitted thereto from combustor 12. In addition to limiting the maximum gas temperature, the resulting unequal temperatures on transition duct 18 may set up troublesome thermal expansion patterns and possibly cause premature failure of transition duct 18.

If a temperature variation is acceptable on transition duct 18, the above temperature pattern is the exact opposite of the desired pattern. That is, portions 34 and 42 near turbine end 36 of transition duct 18 are less robust than are portions 30 and 40 near combustor end 32, and are thus less capable of withstanding higher temperatures. At least part of this reduction in robustness ensues from the connection of an aft support 44 to portion 42. In the ideal, the temperatures of portions 30 and 40 should be approximately equal and may be permitted to rise substantially higher than the temperatures of portions 34 and 42. The temperatures of portions 34 and 42 should be approximately equal.

Before turning to the impingement cooling technique according to the invention, a brief discussion follows for aiding an understanding of the disclosure.

Figure 2:
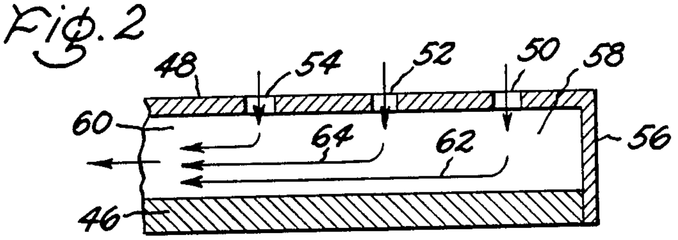
FIG. 2 is a cross section of a plate to be cooled and an impingement plate to which reference will be made in describing the effect of air crossflow on the performance of impingement jets.

Referring now to FIG. 2, there is shown a plate 46 whose surface is to be cooled by impingement cooling. An impingement plate 48, spaced from the surface of plate 46, is pierced by a plurality of holes 50, 52 and 54. A closed end 56 bridges plate 46 and impingement plate 48 forms a chamber 58. An exit 60 in chamber 58 provides the only opening through which all air injected through holes 50, 52 and 54 must exit.

It will be recognized that a pressure drop across impingement plate 48 is effective to produce air jets flowing through holes 50, 52 and 54. Hole 50, being closest to closed end 56, forms an impingement jet which impinges on plate 46. After impinging on plate 46, the air from hole 50 must flow toward exit 60 as indicated by an air flow arrow 62. Air in the impingement jet formed by hole 52, whose flow is indicated by an air flow arrow 64, must penetrate the crossflow created by the air injected by hole 50. Assuming that the volumes of air injected into chamber 58 by holes 50 and 52 are equal, then the volume of air formed in the combined air flows from holes 50 and 52 is twice the volume from hole 50 alone. As a consequence, the combined air flow downstream of hole 52 has twice the volume and twice the velocity of the crossflow air in air flow arrow 62 arriving at hole 52. This combined volume forms the crossflow through which hole 54 must project its jet upon plate 46. The total air passing downstream of hole 54 has thrice the velocity of that upstream of hole 52. As the crossflow velocity increases with increasing downstream distance, the ability of the impingement jets to reach, and adequately cool, the surface of plate 46 decreases.

Figure 3A:
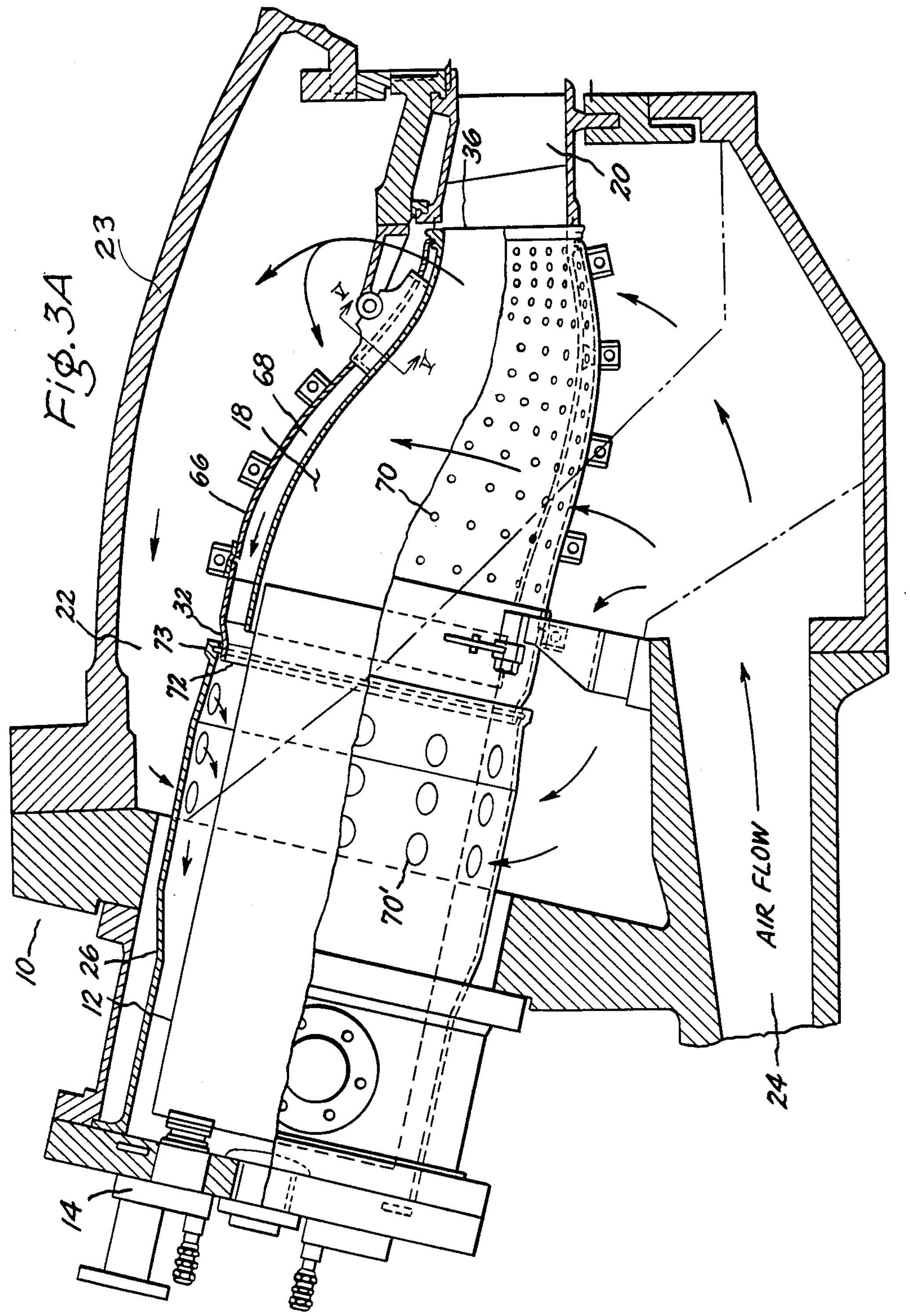
FIG. 3A is a simplified view, partially in cross section, of a combustor and a transition duct employing impingement cooling according to an embodiment of the invention.

The embodiment of the invention shown in FIG. 3A, to which reference is now made, permits tailoring the cooling to produce a desired temperature pattern on transition duct 18. An impingement sleeve 66 surrounding, and spaced from, transition duct 18 forms a flow volume 68 therebetween which is substantially sealed at turbine end 36 and is open at combustor end 32 thereof. Impingement sleeve 66 is pierced by a plurality of apertures 70 for training a plurality of impingement jets which impinge upon transition duct 18. As explained in the foregoing, since the spent impingement air must all flow toward an exit 72 at combustor end 32, its massflow must increase systematically toward exit 72.

It is important to limit the overall pressure drop across the impingement sleeve, or the difference between the pressure in plenum 22 (the compressor discharge pressure) and that at exit 72 of flow volume 68. For example, it may be desirable to limit this pressure drop to less than two percent of the compressor discharge pressure. As explained in the foregoing, the overall pressure drop through impingement sleeve 66 results from the accumulation of the pressure drop across apertures 70 and the pressure required to accelerate the spent impingement air up to the crossflow velocity in flow volume 68.

As is well known, the velocity of a gas flowing in an enclosed channel, varies inversely as the cross-sectional area of the channel. It will be noted that the height of flow volume 68 increases from turbine end 36 to combustor end 32. This tends to reduce the air flow velocity near exit 72 compared to the velocity the air would attain if the smaller height of flow volume 68 were continued throughout its length. This permits taking advantage of a small height of flow volume 68 near turbine end 36 where the crossflow mass flow rate is small, while still limiting the velocity of the cross flow nearer exit 72.

When the spacing between impingement sleeve 66 and transition duct 18 is greater, a greater mass flow rate is required in an impingement jet for the impingement jet to impact transition duct 18 with enough velocity to provide adequate cooling. An increased mass flow rate is achieved without requiring an increase in pressure drop across impingement sleeve 66 by making the areas of apertures 70 larger near exit 72 than near turbine end 36. The total air flow density produced by the array of larger apertures 70 may be made greater than, equal to, or less than the total air flow density of the array in the areas having smaller apertures 70 by varying the spacing between bands of apertures 70, and by varying the spacing between apertures 70 in a band. All of these variables are illustrated in FIG. 3. That is, the apertures 70 in the first band of apertures about impingement sleeve 66 adjacent turbine end 36 are shown much more closely spaced than are those in the last band of apertures 70 adjacent exit 72. Also, the spacing between the first two bands of apertures at turbine end 36 is much smaller than the spacing between the last two bands of apertures adjacent exit 72 Systematic variation in hole-to-hole and band-to-band spacing is seen at intermediate points.

The flexibility of surface cooling offered by any one of the above variables permits tailoring of cooling to the requirements of a particular application. When the variables are controlled in pairs, or all together, substantially total control of impingement cooling of transition duct 18 is achieved with an acceptably low pressure drop across impingement sleeve 66.

Referring further to FIG. 3A, apertures 70' in flow sleeve 26 permit that portion of the combustor air flow which does not pass through impingement sleeve 66 to combine with the impingement air flow spent prior to commencing combustion. The number, size and distribution of apertures 70' are selected to permit the desired airflow, and create the required overall pressure drop for the impingement sleeve. A seal 73 between flow sleeve 26 and impingement sleeve 66 permits considerable misalignment therebetween while preventing air flow from entering at their junction. Such entry would imbalance the air flow split between them. It should be understood that, because the air flow through apertures 70' is perpendicular to that of the spent impingement air flow, there is an additional pressure drop required to accelerate this flow up to the new crossflow velocity based on the sum of the impingement air flow, the air flow through each row of apertures 70' and the annular flow area between flow sleeve 26 and combustor 12.

Figure 4:
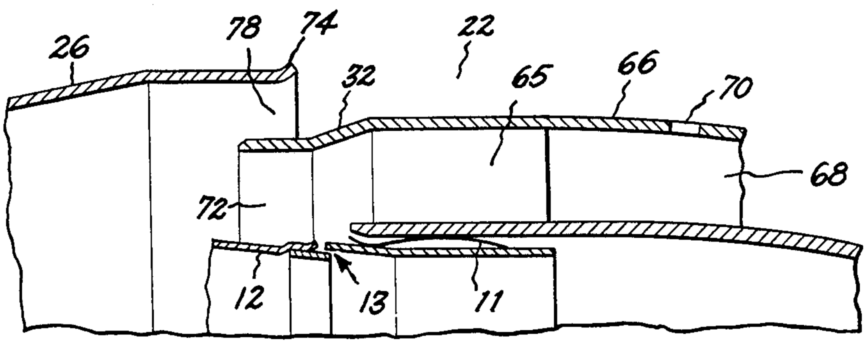
FIG. 4 is an enlarged view of an exit portion of the flow volume of FIG. 3.
Figure 3B:
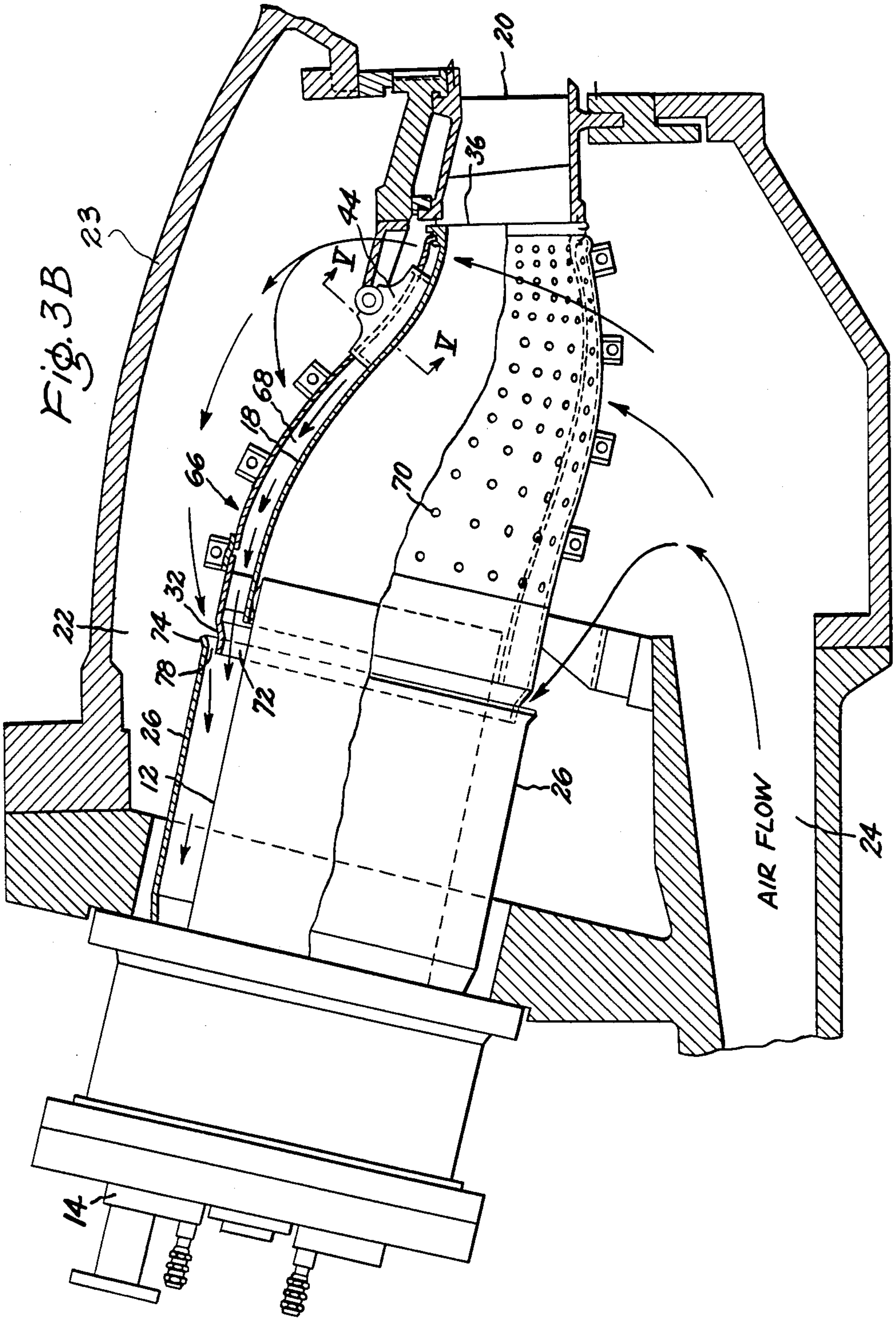
FIG. 3B is a simplified view, partially in cross section, of a combustor and a transition duct employing impingement cooling according to another embodiment of the invention.

An alternate embodiment of the invention shown in FIG. 3B is quite similar to that shown in FIG. 3A. The principal difference is in the configuration of flow sleeve 26 and the junction between exit end 32 of impingement sleeve 66 and flared entry portion 74 of flow sleeve 26. An enlarged view of this junction is shown in FIG. 4, in which exit 72 is surrounded by a flared entry portion 74 of flow sleeve 26, creating an annular flow passage 78. Annular flow passage 78 takes the place of apertures 70' (FIG. 3A) having an area calculated to permit the required air flow to pass while creating the required overall pressure drop for impingement sleeve 66. Because the pressure drop from plenum 22 to the exit of annular flow passage 78 is equal to the overall pressure drop across impingement sleeve 66, the airflow velocity exiting annular flow passage 78 is considerably higher than the velocity at exit 72. As these two flows converge within flow sleeve 26, there is a favorable momentum transfer to the impingement sleeve flow thereby creating a low-pressure region in the vicinity of exit 72 thus functioning to scavenge the spent impingement cooling air from flow volume 68. The net effect of this scavenging action is to reduce the overall pressure drop between plenum 22 and the interior of flow sleeve 26, compared to that obtained in the embodiment shown in FIG. 3A for the same overall pressure drop through impingement sleeve 66. This embodiment requires precise control of the size of annular flow passage 78 in order to achieve consistent flow split and pressure drop performance among ten or more combustors operating in parallel, as is the case in a conventional or advanced heavy duty gas turbine engine.

Figure 5:
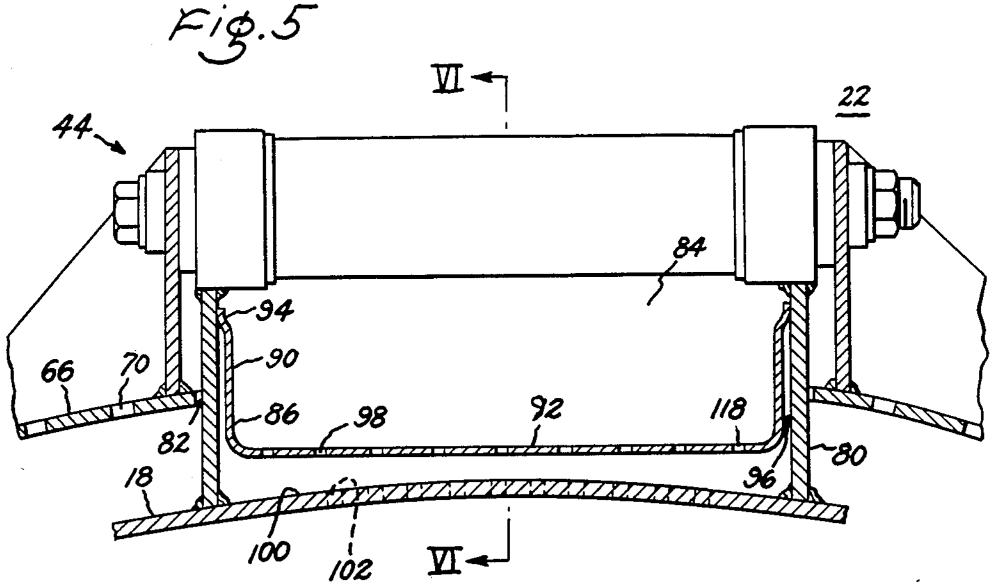
FIG. 5 is a cross section taken along V—V of FIG. 3.

Referring now to FIG. 5, aft support 44 includes a generally circular wall 80 welded at substantially its entire perimeter to transition duct 18 and extending through a circular opening 82 in impingement sleeve 66, thus forming a blind cup-shaped volume 84 which is open to plenum 22 at its upper end but which is substantially closed at its lower end. A complete disclosure of the structure and function of aft support 44 is contained in U.S. Pat. No. 4,422,288 whose disclosure is incorporated herein by reference. It should be noted that transition duct 18 is curved outward toward cup-shaped volume 84 in this cross section. The following disclosed technique for providing cooling to the portion of transition duct 18 which is enclosed within circular wall 80 provides an excellent example of the power and flexibility for tailoring the impingement cooling of a surface over which differences in heat load, distance and air cross-flow volume are all encountered.

An impingement insert 86, having an upward-directed wall 90 and a planar bottom 92 is tightly fitted into cup-shaped volume 84 with planar bottom 92 spaced from the surface of transition duct 18. Upward-directed wall 90 preferably includes a flange 94 at its upper extremity for attachment to the inner surface of circular wall 80. Flange 94 is preferably attached to circular wall 80 using, for example, welding. An annular space 96 between upward-directed wall 90 and circular wall 80 permits insert 86 and wall 90 to reach the same temperature before they are joined at flange 94 thus minimizing the thermal stress at this joint. A plurality of apertures 98 in planar bottom 92 permit the pressurized air in plenum 22 to form impingement jets for cooling an enclosed surface 100 of transition duct 18 within circular wall 80.

Since enclosed surface 100 is surrounded by circular wall 80, the spent impingement air must be released from the space between impingement insert 86 and enclosed surface 100 in a different manner than was used in the impingement cooling technique described in the preceding. The amount of cooling air required to cool enclosed surface 100 is a negligible proportion of the total air supply. It is therefore leasible to vent the spent impingement all into the interior of transition duct 18 through film cooling apertures 102 without paying a significant penalty in reduced efficiency of air flow useage.

Figure 6:
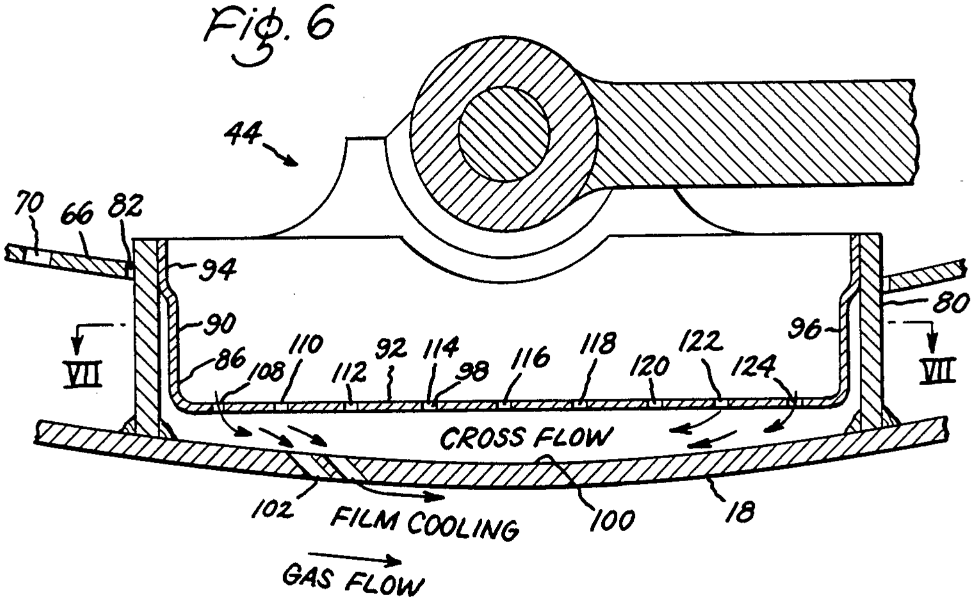
FIG. 6 is a cross section taken along VI—VI of FIG. 5.
Figure 7:
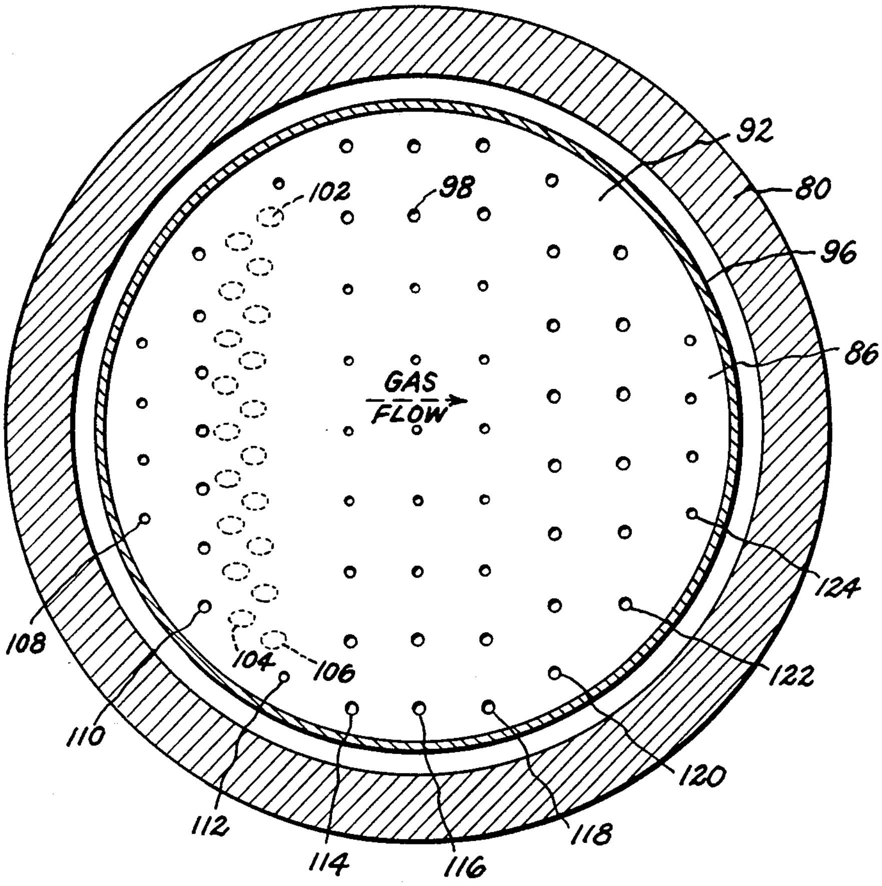
FIG. 7 is a cross section taken along VII—VII in FIG. 6.

Referring now also to FIGS. 6 and 7 (film cooling apertures 102, located beneath planar bottom 92 in FIG. 7, are shown in dashed line), film cooling apertures 102 are disposed in two staggered rows 104 and 106 located near the upstream edge of planar bottom 92 with respect to the gas flow within transition duct 18. As best illustrated in FIG. 6, film cooling apertures 102 are inclined in the direction of gas flow thereby encouraging film cooling of the inner surface of transition duct 18 by the air passing therethrough. Such film cooling strongly modifies the local heat load downstream of film cooling apertures 102. In addition, the location of film cooling apertures 102 near the gas-flow upstream edge of planar bottom 92 requires that all of the impingement cooling air entering through apertures 98 must flow toward rows 104 and 106 thereby producing a strong crossflow capable of interfering with impingement cooling by air jets nearer rows 104 and 106 as previously described. A further complication in providing impingement cooling of enclosed surface 100 is seen in a comparison of the shape of transition duct 18 within enclosed surface 100 in the orthogonal cross sections of FIGS. 5 and 6. That is, whereas enclosed surface 100 in the cross section of FIG. 5 is closer to planar bottom 92 at its center that it is at its perimeter, the opposite is true in the longitudinal cross section of FIG. 6. Thus, all three of the variables which complicate tailored cooling of enclosed surface 100 are present. That is, the local heat load on enclosed surface 100 is modified by film cooling, the effectiveness of impingement jets is affected by air crossflow, and is further affected by the changing distance through which the jets must penetrate before impinging on the surface of enclosed surface 100.

Reference is now made specifically to FIG. 7. Apertures 98 are arranged in nine rows 108–124, each aligned transverse to the gas-flow path. The three apertures 98 closest to the center of each of rows 114, 116 and 118 are of relatively small diameter. This smallness is in response to two factors, (1) this region of enclosed surface 100 is strongly film cooled by film cooling apertures 102, and (2) planar bottom 92 and enclosed surface 100 are spaced relatively close together, as seen in the cross section through row 116 in FIG. 5. The outer three apertures 98 in rows 114, 116 and 118 become progressively larger in response to the increasing distance over which the impingement jets must be projected (see FIG. 5).

Rows 108 and 124 contain apertures 98 of intermediate size and closest spacing. This is in response to the combination of the shorter distance between planar bottom 92 and enclosed surface 100 in these locations (see FIG. 6) as well as the fact that there are no upstream impingement jets to produce a crossflow to interfere with the projection of cooling air upon enclosed surface 100. Row 110 and 122 contain apertures 98 of larger size and wider spacing to compensate for the presence of crossflow from upstream impingement jets as well as the increasing distance (see FIG. 6).

From the foregoing, it is clear that the present invention is capable of tailoring the cooling provided by impingement jet cooling over an area where the three variables of heat load, distance and air crossflow are present in independent fields over the areas of interest. In the embodiment of the invention wherein the surface area of transition duct 18 is cooled using impingement sleeve 66, air crossflow velocity is controlled by purposely increasing the distance between transition duct 18 and impingement sleeve 66 and compensating for the increased distance by increasing the diameters of apertures 70. The spacing of the larger-diameter apertures 70 is increased to control the air mass flow density. In the embodiment of the invention wherein enclosed surface 100 within aft support 44 is cooled, the distance is generally fixed by the design of transition duct 18. The varying distances are accommodated by suitably controlling the diameter and spacing of apertures 98. Additionally, the problem of disposing of the spent impingement air is solved by employing the spent impingement air for film cooling and by further modifying the diameter and spacing of apertures 98 to compensate for the resulting variation in the heat load over enclosed surface 100.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An impingement cooling apparatus for cooling a surface of a transition duct disposed between a combustor and a turbine stage of a gas turbine engine, said transition duct being disposed in a compressed air plenum, comprising:
   - an impingement sleeve surrounding said transition duct and spaced a distance therefrom to form a flow volume therebetween:
   - a plurality of apertures in said impingement sleeve;
   - each of said plurality of apertures having an area:
   - adjacent ones of said plurality of apertures being separated by a spacing:
   - a closed end at a turbine end of said flow volume;
   - an exit at a combustor end of said flow volume;
   - a flow sleeve within the compressed air-plention surrounding said combustor;
   - a flared entry portion at an end of said flow sleeve overlapping said exit and forming an aerodynamic converging shape therebetween;
   - a flow of air through said aerodynamic converging shape flowing toward said combustor being effective to reduce a pressure at said exit below a pressure in said compressed air plenum whereby a pressure drop across said impingement sleeve produces an impingement jet of air from each of said plurality of apertures directed toward said transition duct: and at least one of said distance, said area and said spacing being non-uniform over said impingement sleeve to control a cooling in said surface.

2. An impingement cooling apparatus according to claim 1 wherein said distance increases from said turbine end to said combustor end.

3. An impingement cooling apparatus according to claim 2 wherein said area increases from said turbine end to said combustor end.

4. An impingement cooling apparatus according to claim 3 wherein said spacing increases from said turbine end to said combustor end.

5. An impingement cooling apparatus according to claim 1 wherein said spacing, said distance and said area are non-uniform to tailor a cooling of said transition duct.

6. In a gas turbine of the type comprising a turbine casing connected to a compressed air supply and including within the turbine casing a plurality of combustors and transition ducts for delivering hot gas to a turbine stage; an improved impingement cooled transition duct wherein the improvement comprises:

an impingement sleeve surrounding each transition duct approximately coextensive therewith and having one end adjacent the combustor and the other end adjacent the turbine stage, a closed end between the impingement sleeve and the transition duct at the turbine end; the impingement sleeve being spaced a radial distance from the transition duct along the axial length of the transition duct, said radial distance larger at the combustor end than at the turbine end; and, a plurality of apertures formed in the impingement sleeve, said apertures larger and spaced farther apart from one another at the combustor end than at the turbine end.

7. In a gas turbine of the type comprising a turbine casing connected to a compressed air supply and including within the turbine casing a plurality of combustors and transition ducts for delivering hot gas to a turbine stage; an improved impingement cooled transition duct wherein the improvement comprises:

an impingement sleeve surrounding each transition duct approximately coextensive therewith and having one end adjacent the combustor and the other end adjacent the turbine stage, a closed end between the impingement sleeve and the transition duct at the turbine end; the impingement sleeve being spaced a radial distance from the transition duct along the axial length of the transition duct, said radial distance larger at the combustor end than at the turbine end;

a plurality of apertures formed in the impingement sleeve, said apertures larger and spaced farther apart from one another at the combustor end than at the turbine end; and, a flow sleeve surrounding each combustor and approximately coextensive therewith, the flow sleeve including a flared entry portion overlapping an exit of the impingement sleeve to define an annular flow passage having a sufficient area whereby the airflow velocity in the annular flow passage exceeds the airflow velocity of the spent impingement air flow.

8. An impingement cooling sleeve for use in a gas turbine wherein the impingement sleeve is adapted to surround a transition duct interconnecting the discharge end of a combustor with the inlet end of a turbine, the surrounding impingement sleeve also having a corresponding combustor end and a turbine end; and, wherein the impingement sleeve comprises:

an increasing flow volume from the turbine end to the combustor end;

a plurality of apertures in the impingement cooling sleeve; each of the apertures increasing in area from the turbine end to the combustor end; the distance between apertures increasing from the turbine end to the combustor end;

the turbine end of the impingement sleeve being sized for closed attachment to the transition duct at the turbine end; and, the combustor end of the impingement sleeve being sized larger than the combustor end of the transition duct to from an exit at the combustor end of the impingement sleeve 9. In a gas turbine of the type comprising a turbine casing connected to a compressed air supply and including within the turbine casing a plurality of combustors and transition ducts for delivering hot gas to a turbine stage; an improved impingement cooled transition duct wherein the improvement comprises:

an impingement sleeve surrounding each transition duct approximately coextensive therewith and having one end adjacent the combustor and the other end adjacent the turbine stage, a closed end between the impingement sleeve and the transition duct at the turbine end; the impingement sleeve being spaced a radial distance from the transition duct along the axial length of the transition duct, said radial distance larger at the combustor end than at the turbine end;

a plurality of apertures formed in the impingement sleeve, said apertures larger and spaced farther apart from one another at the combustor end than at the turbine end;

a flow sleeve surrounding each combustor and approximately coextensive therewith;

an annular seal between the flow sleeve and the impingement sleeve; and, a plurality of apertures formed in the flow sleeve whereby a portion of the compressed air supply which does not pass through the impingement sleeve is combined with the spent impingement air flow.

10. In a gas turbine of the type comprising a turbine casing connected to a compressed air supply and including within the turbine casing a plurality of combustors and transition ducts for delivering hot gas to a turbine stage; an improved impingement cooled transition duct wherein the improvement comprises:

an impingement sleeve surrounding each transition duct approximately coextensive therewith and having one end adjacent the combustor and the other end adjacent the turbine stage, a closed end between the impingement sleeve and the transition duct at the turbine end; the impingement sleeve being spaced a radial distance from the transition duct along the axial length of the transition duct, said radial distance larger at the combustor end than at the turbine end;

a plurality of apertures formed in the impingement sleeve, said apertures larger and spaced farther apart from one another at the combustor end than at the turbine end; and, wherein the improved transition duct includes an aft support having a continuous wall attached to the transition duct, the improvement further comprising:

an impingement insert comprising a wall portion and a planar bottom tightly fitted within the aft support continuous wall and having the planar bottom spaced a distance from the transition duct surface;

a plurality of apertures formed in the planar bottom for directing impingement air to the surface of the transition duct; and, a plurality of film cooling apertures in the transition duct whereby impingement cooling air is exhausted into the hot gas flow.

11. The improved impingement cooled transition duct recited in claim 10 wherein the area and spacing of the apertures in the planar bottom are varied in accordance with the distance between the planar bottom and the surface of the transition duct.

* * * * *